United States Patent [19]
Ellis et al.

[11] 4,019,375
[45] Apr. 26, 1977

[54] MEANS FOR INDUCING VIBRATION IN AN AIRFOIL

[75] Inventors: Delmar H. Ellis, Cincinnati; John E. Baker, Loveland; Wayne M. Shaffernocker, Mason; Ralph W. Scott, Cincinnati, all of Ohio

[73] Assignee: General Electric Company, Cincinnati, Ohio

[22] Filed: Dec. 22, 1975

[21] Appl. No.: 643,077

[52] U.S. Cl. .................... 73/71.5 R; 73/93; 73/99
[51] Int. Cl.² ............. G01M 7/00; G01N 3/32
[58] Field of Search .......... 73/67, 67.2, 67.3, 67.4, 73/71.5, 93, 99

[56] References Cited
UNITED STATES PATENTS

| 2,362,467 | 11/1944 | Clark | 73/67.2 |
| 3,680,366 | 8/1972 | Moser et al. | 73/99 |

OTHER PUBLICATIONS

A. R. Willson, Vibration Testing of Airplanes, Electronics, Mar. 1949, pp. 86–91.

S. Fleeter et al., The Torsional Flutter Characteristics of a Cantilevered Airfoil, etc. AIAA Paper No. 74-530, June 17-19, 1974, pp. 1-8.
S. Fleeter, et al. A Unique Supersonic Inlet Unsteady Aerodynamic Cascade Experiment, AIAA Paper No. 74-622, July 8-10, 1974, pp. 1-8.

*Primary Examiner*—Herbert Goldstein
*Assistant Examiner*—John P. Beauchamp
*Attorney, Agent, or Firm*—Henry J. Policinski; Derek P. Lawrence

[57] ABSTRACT

An apparatus for inducing vibratory oscillations in an airfoil is provided to simulate the dynamic aeroelastic interaction between the airfoil and a gas flow field. The apparatus includes first means for supporting the airfoil during inducement of the vibrations and second means movable in response to variations in magnetic flux to rotate the airfoil about first and second axes. Third means are provided for generating a variable magnetic flux field in response to an electrical control signal provided by fourth means.

16 Claims, 6 Drawing Figures

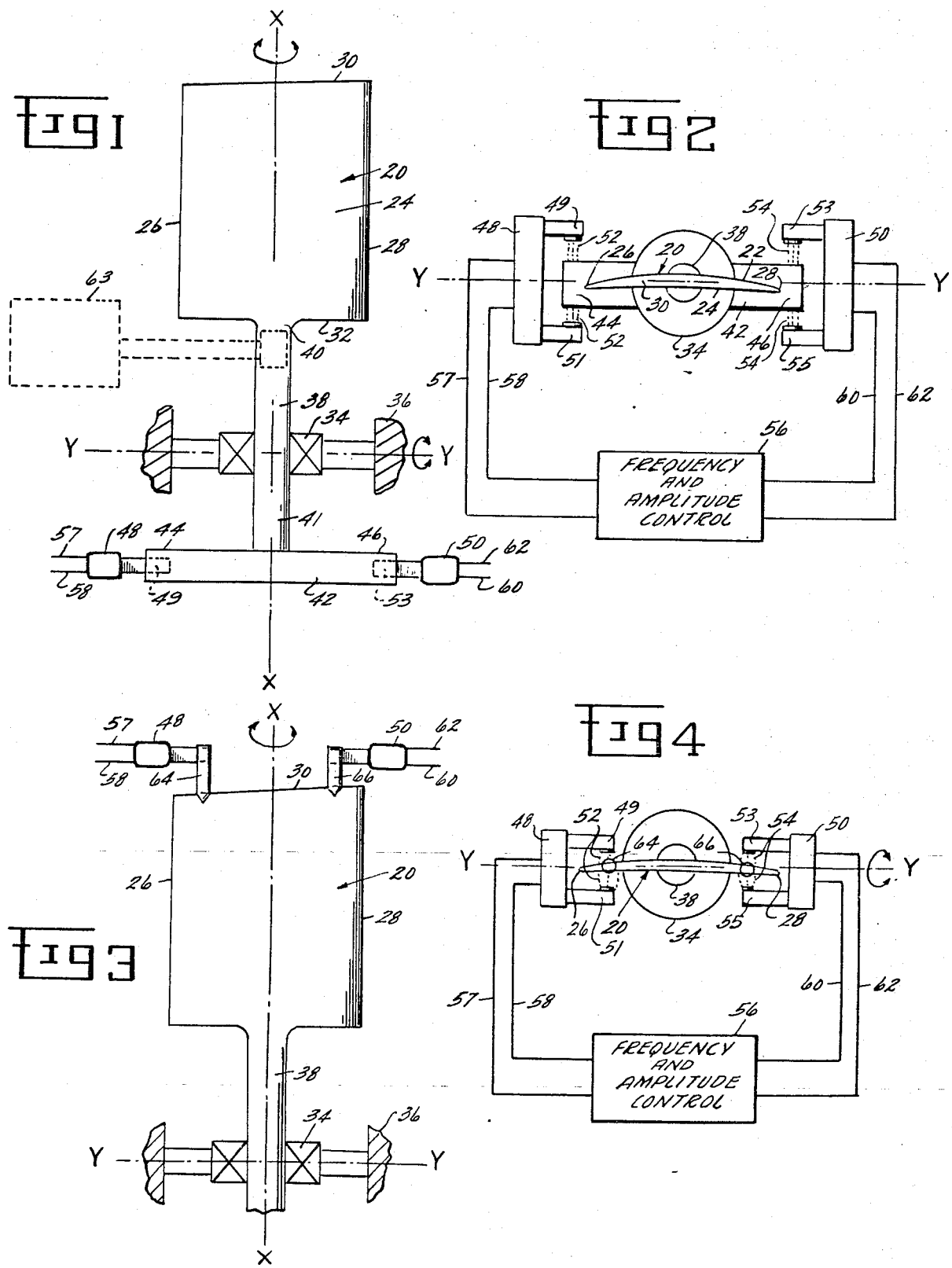

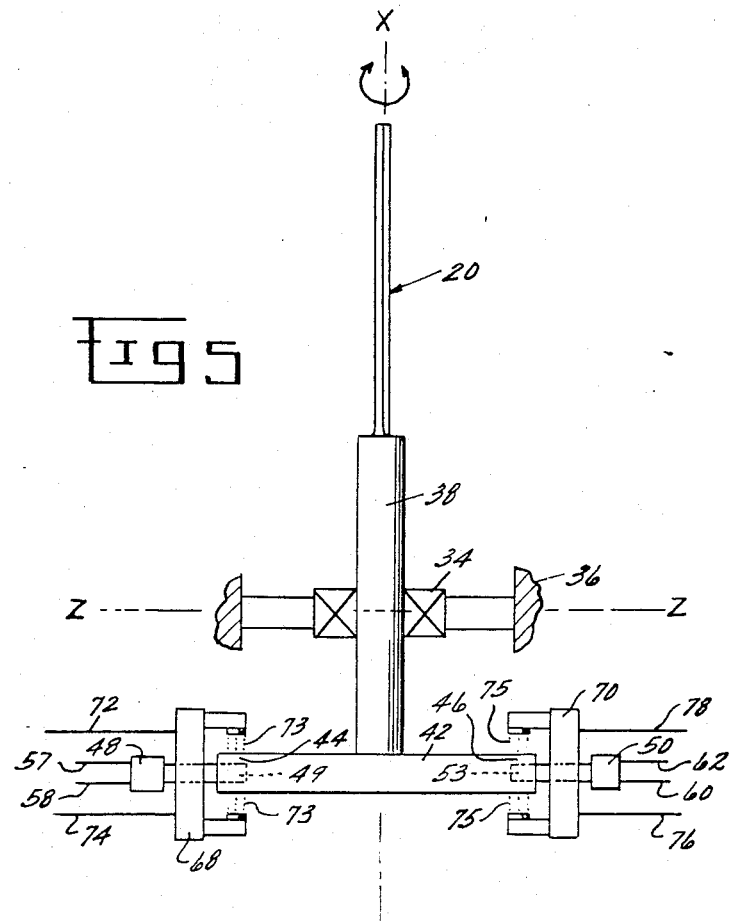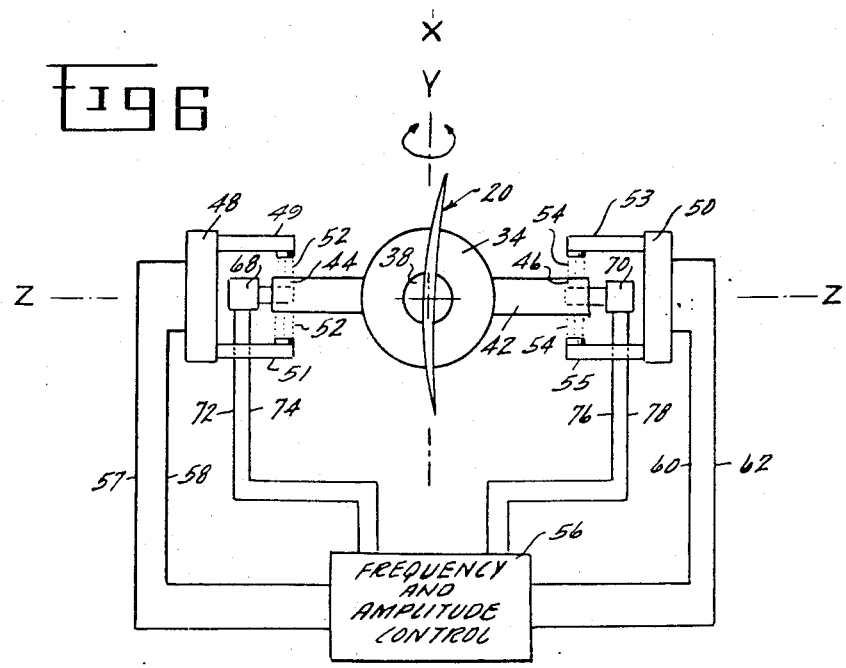

MEANS FOR INDUCING VIBRATION IN AN AIRFOIL

BACKGROUND OF THE INVENTION

This invention relates to an apparatus for inducing vibrations in an airfoil, particularly an airfoil used in various components of a gas turbine engine.

Fan or compressor airfoil design is an area of gas turbine engine technology presently in need of advancement. In order to achieve improvements in engine and aircraft efficiency, new compact lightweight and aerodynamically optimized airfoils must be developed. A limiting constraint which must be given thorough consideration in the design of new airfoils is the dynamic aeroelastic interaction between the airfoil and the gas flow field in which it operates. While analytical investigations may be undertaken to mathematically model the aforedescribed aeroelastic interaction phenomenon, such models cannot be accepted as accurate and correct until verified through empirical data.

In the past such models have been partially verified by the acquisition of empirical data from experimental testing involving the excitation or oscillation of the airfoil in a torsional mode; that is, a rotational mode about the longitudinal axis of the airfoil. Some test apparatus, which has been used to generate the data, can be generally characterized as an electromagnetic system which rotatively oscillates the airfoil about its longitudinal axis at appropriate amplitudes and frequencies to attempt to simulate the vibration caused by the aeroelastic interaction between the airfoil and gas flow field.

Past analytical investigations have met with only partial success in mathematically modeling the aforedescribed aeroelastic interaction since they have failed to recognize that a typical airfoil will vibrate in a gas flow field not only in a torsional mode but also in flexural mode; that is in a direction perpendicualr to the airfoil surfaces. Said another way, the aeroelastic vibration of a typical airfoil disposed in a gas stream will exhibit both a torsional mode and a flexural mode each of which must be taken into consideration when mathematically modeling the interaction. This present invention is directed at apparatus for oscillating the airfoil simultaneously in a flexural mode and a torsional mode to simulate the vibration caused by the aeroelastic interaction between the airfoil and the gas flow field in which it is disposed.

SUMMARY OF THE INVENTION

It is an object of the present invention, therefore, to provide an apparatus for driving an airfoil in oscillation to simulate the vibration caused by the interaction between the airfoil and the gas flow field in which the airfoil is disposed.

It is another object of the present invention to provide an apparatus for driving an airfoil in oscillation simultaneously in a torsional mode and a flexural mode.

It is still another object of the present invention to provide an apparatus for providing electromagnetic means for driving an airfoil in oscillation simultaneously in a torsional mode and a flexural mode.

It is yet another object of the present invention to provide an apparatus for driving an airfoil in oscillation about a pair of axes.

It is another object of the present invention to provide an apparatus for acquiring empirical data useful in characterizing the interaction between an airfoil and the gas flow field in which it resides.

Brifly stated, the above and other related objects of the present invention, which will become apparent from the following specification and appended drawings, are accomplished by the present invention which provides an apparatus for inducing vibrations in an airfoil blade extending longitudinally about a first axis. The airfoil includes a pair of generally opposed airfoil surfaces and a tip portion and a base portion, each connecting one airfoil surface to the other. The apparatus further comprises first means for supporting the airfoil during inducement of the vibrations and second means operatively connected to the airfoil and movable in response to variations in magnetic flux. The second means are operable to pivotally rotate the airfoil blade about the first axis and also about a second axis perpendicular to the first axis. Third means, responsive to an electrical control signal, are provided for generating a variable magnetic flux field. The second means are disposed within the magnetic flux field so as to be responsive to variations in the magnetic flux field. Fourth means provide an electrical control signal to the third means. The aforementioned second axis may reside in the airfoil mean surface plane. The aforementioned second means may include an excitable element operatively connected to either of the tip or base portions and rotatable about both the first and second axes in response to variations in the magnetic flux. The excitable element may include first and second spaced apart portions wherein the first portion is responsive to variations in a first magnetic flux field and the second portion is responsive to variations in a second magnetic flux field. The first and second spaced apart portions may also be responsive to variations in third and fourth magnetic flux fields respectively.

DESCRIPTION OF THE DRAWINGS

While the specification concludes with a series of claims which particularly point out and distinctly claim the subject matter comprising the present invention, a clear understanding of the invention will be readily obtained from the following detailed description, which is given in connection with the accompanying drawings in which:

FIG. 1 depicts a schematic view of one embodiment of the airfoil blade oscillating apparatus comprising the present invention;

FIG. 2 exhibits a schematic top view of the apparatus depicted in FIG. 1;

FIG. 3 shows a schematic view of another embodiment of the blade oscillating apparatus comprising the present invention;

FIG. 4 exhibits a schematic top view of the apparatus depicted in FIG. 3;

FIG. 5 shows a schematic view of a third embodiment of the blade oscillating apparatus comprising the present invention; and FIG. 6 exhibits a schematic top view of the apparatus depicted in FIG. 5.

DESCRIPTION OF THE PREFERRED EMBODIMENT

Refering now to the drawings, FIGS. 1 and 2 depict a schematic view of an airfoil blade 20 in cooperation with an apparatus comprising one form of the present invention. Airfoil blade 20 is comprised of a pair of generally opposed airfoil surfaces 22 and 24 joined together at a leading edge 26 and trailing edge 28. Tip portion 30 and base portion 32 each join airfoil surface 22 to airfoil surface 24.

Means, for supporting airfoil blade 20 for rotation about a longitudinal axis X—X and about a transversely extending axis Y—Y, perpendicualr to axis X—X, are comprised generally of a bearing assembly 34 which is rigidly mounted on a fixed support shown schematically at 36. Bearing assembly 34 supports blade 20 for rotation in a manner hereinafter to be described and can be of any conventional design, such as a spherical bearing or gyro-gimbal, which permits rotation therein with two degrees of freedom.

Bearing assembly 34 receives elongated cylindrical stem 38 which is secured at one of its ends 40 to base portion 32 of airfoil blade 20 and at its other end 41 to an excitable element or load beam 42 disposed perpendicularly to stem 38. Load beam 42 extends transversely with respect to stem 38 and lies in the mean surface plane (that is, a plane generally containing both airfoil surfaces 22 and 24 of airfoil surfaces 22 and 24. Load beam 42 includes spaced apart excitable end portions 44 and 46 which are adapted responsive to variations in a magnetic flux field.

Means comprised of first and second electromagnetic drivers 48 and 50 are provided in close spaced proximity to end portions 44 and 46 respectively for generating first and second variable magnetic flux fields 52 and 54 respectively. Electro-magnetic driver 48 includes spaced apart exciter portions 49 and 51 and electromagnetic driver 50 includes spaced apart exciter portions 53 and 55. Excitable end portion 44 is disposed in magnetic field 52 between exciter portions 49 and 51 and excitable end portion 46 is disposed in flux field 54 between exciter portions 53 and 55.

In the preferred arrangement depicted in FIG. 1, airfoil blade 20, stem 38 and load beam 42 are disposed for rotation about the X—X axis in the direction indicated by the arrows. Each of these elements are also adapted for pivotal rotation about horizontal axis Y—Y as indicated by the direction of the arrows. The Y—Y axis is disposed in the mean surface plane of airfoil surfaces 20 and 22 and intersects the center of rotation of bearing assembly 34. Load beam 42 is also parallel to the mean surface plane of airfoils 22 and 24.

Controlled vibration or oscillation of airfoil blade 20 about the X—X and the Y—Y axes is accomplished in the following manner. Electromagnetic drivers 48 and 50 are each electrically connected via conductors 57, 58 and 60, 62 respectively to a frequency and amplitude signal control device 56 which provides a control signal to electromagnetic drivers 48 and 50 thereby inducing flux variations in magnetic flux fields 52 and 54. Electromagnetic drivers 48 and 50 and signal control device 56 are of a type well known in the art.

End portion 44 of beam 42 is responsive to variations in the magnetic field 52 so as to be movable between exciter portions 49 and 51 in a direction and at a velocity in proportion to the amplitude and frequency of the alternating current signal received by electromagnetic driver 48 from signal control 56. Similarly, end portion 46 is responsive to magnetic field 54 and likewise is movable between exciter portions 53 and 55 in a direction and at a velocity in proportion to the amplitude and frequecny of the alternating current signal recieved by electromagnetic driver 50 from signal control 56.

Where the alternating electrical control signals delivered to electromagnetic drive 48 through electrical connectors 57 and 58 are out of phase by 180° with the alternating electrical control signal delivered to electromagnetic driver 50, end portions 44 and 46 will move in pure rotation about the axis X—X. By way of example, with a 180° phase difference, when end portion 44 is displaced in the direction of exciter portion 49, end portion 46 will be displaced in the direction of exciter portion 55. Conversely, when end portion 44 is displaced toward exciter portion 51, end portion 46 will be displaced toward exciter portion 53. In this manner beam 42, stem 38 and airfoil blade 20 are caused to oscillate in a torsional mode about the X—X axis.

Where the alternating electrical control signals delivered to electromagnetic drivers 48 and 50 are in-phase, end portions 44 and 46 will rotate about the Y—Y axis. By way of example, in-phase electrical control signals will simultaneously displace end portion 44 toward exciter portion 49 and end portion 46 toward exciter portion 53. As viewed in FIG. 1, beam 42 will translate into the plane of the paper, pivoting about the Y—Y axis and thereby causing airfoil blade 20 to translate out of the plane of the paper. Although this movement is purely rotational about the Y—Y axis, the relatively small amplitude of the movement of airfoil blade 20 closely simulates the flexural mode of vibration (that is, movement of the blade in a direction generally normal to the airfoil surface) encountered in a gas flow field. Similarly, in-phase control signals will simultaneously displace end portions 44 and 46 toward exciter portions 51 and 55, respectively, causing rotation of airfoil blade 20 about the Y—Y axis in the opposite direction (that is out of the plane of the paper). In this manner, airfoil blade 20 is caused to oscillate about the Y—Y axis.

Simultaneous oscillation of airfoil blade 20 in both the torsional mode and the flexural mode is achieved by providing a phase difference between 0° to 180° between the electrical control signals delivered to electromagnetic drivers 48 and 50. A phase difference in a range between 0° and 180° superimposes the pure torsional mode and the pure flexural mode to effect oscillation of the airfoil blade 20 in a mode which is a combination of both torsional and flexural rotation. Through the use of phase differences, frequency differences and amplitude differences, the control signals delivered to electromagnetic drivers 48 and 50 can be used to provide a variety of oscillating motions to airfoil blade 20. However, in each instance, the oscillatory motion will be comprised of a torsional oscillation about the X—X axis and a flexural oscillation about the Y—Y axis.

Oscillation of airfoil 20 in the manner hereinbefore described simulates the vibration caused by the dynamic aeroelastic interaction between the airfoil and the gas flow field. Stress and force data induced by the vibration is readily obtained by instrumenting the airfoil 20 or stem 38 with data acquisition devices such as a strain gage appparatus shown generally at 63. Other data acquisiton devices such as pressure sensor array appparatus and accelerometer array appparatus may also be utilized to record operating pressures and forces induced in the airfoil 20. The vibration apparatus described above may also include a position-sensing feedback device (not shown) which provides an error signal to signal control 56 for correcting oscillatory deviations of the airfoil from intended frequencies and amplitudes. These position-sensing devices may be mechanical, electrical, magnetic or optical in nature and are generally well known in the art.

Referring now to FIGS. 3 and 4, a schematic view of a modified version of the apparatus shown in FIG. 1 is depicted. Blade airfoil 20 is mounted for rotation about the X—X and Y—Y axes in a manner identical to that described with reference to FIG. 1. However, the apparatus depicted in FIGS. 3 and 4 does not incorporate a load beam attached to stem portion 38. Rather a pair of spaced apart excitable load posts 64 and 66 are integrally attached to tip portion 30 of airfoil blade 20 and project longitudinally therefrom in a direction parallel to the X—X axis. Electromagnetic drivers 48 and 50 are provided in close spaced proximity to load posts 64 and 66 respectively and generate first and second variable magnetic flux fields 52 and 54. Load posts 64 and 66 are disposed in and responsive to magnetic fields 52 and 54 respectively. Electrical control signals are provided by signal control 56 to electromagnetic drivers 48 and 50 in a manner identical to that described in FIG. 1. Furthermore, torsional and flexural oscillation of airfoil blade 20 is achieved by the same method as described for apparatus depicted in FIG. 1.

Use of load posts 64 and 66 secured to tip portion 30 provides an alternative to the scheme depicted in FIG. 1. Since the magnetic forces oscillating airfoil blade 20 in the FIG. 3 embodiment are applied at a greater distance from bearing support 34 than in the FIG. 1 embodiment a greater moment arm is available for use in overcoming the loads exerted on the airfoil blade 20 by the flowing gas. Accordingly, a smaller, more compact electromagnetic driver may be used in the apparatus and the entire longitudinal length of the apparatus may be reduced since a moment arm need not be provided below bearing support 34.

Referring to FIGS. 5 and 6, a schematic view of another modified version of the apparatus shown in FIG. 1 is depicted. Briefly stated, the modifications are generally limited to the orientation of load beam 42 perpendicular to the mean surface plane of airfoil blade 20 rather than parallel thereto and the provision of two additional electromagnetic elements 68 and 70.

As viewed in FIGS. 5 and 6, load beam 42 is oriented perpendicuar to the mean surface plane of airfoil blade 20 and hence parallel to the Z—Z axis. Blade airfoil 20 is mounted for rotation about the X—X and y—Y axes in the same manner as that described for FIG. 1. End portion 44 of load beam 42 is disposed closely proximate electromagnetic drivers 48 and 68 so as to be responsive to first and third variable magnetic flux fields 52, 73 generated respectively thereby. End portion 46 of load beam 42 is disposed closely proximate electromagnetic drives 50 and 70 so as to be responsive to second and fourth variable magnetic flux fields 54, 75 generated respectively thereby.

Electromagnetic drivers 48 and 50, which generate the aforementioned first and second variable flux fields 52, 54 are connected by electrical connectors 57, 58 and 60, 62 respectively to signal control 56. Signals received by electromagnetic drivers 48 and 50 are 180° out-of-phase with each other such that load beam 42 and airfoil blade 20 are driven in rotation, in the same manner as described with reference to FIG. 1 about the X—X axis in a manner to effect oscillation of blade 20 in the torsional mode.

Electromagnetic drivers 68 and 70, which provide third and fourth variable magnetic flux fields 73, 75 respectively, are connected to signal control 56 by electrical connectors 72, 74 and 76, 78 respectively. With an 180° out-of-phase signals electromagnetic drivers 68 and 70 effect rotational oscillation of load beam 42 and airfoil blade 20 about axis Y—Y. Hence, airfoil blade 20 is driven in oscillation in the flexural mode about the Y—Y axis.

In the embodiment of the present invention depicted in FIGS. 5 and 6, oscillation of airfoil blade 20 in both a torsional and flexural mode is achieved with separate pairs of electromagnetic drivers. One pair of drivers 48 and 50 provide oscillation in the torsional mode about the X—X axis whereas the other pair of drivers 68 and 70 provide oscillation in the flexural mode about the Y—Y axis.

While a number of preferred embodiments of the present invention have been described and depicted, it will be appreciated by those skilled in the art that many modifications, substitutions and changes may be made thereto without departing from the scope of the invention as set forth in the appended claims.

What is claimed is:

1. An apparatus for inducing vibrations in an airfoil blade extending longitudinally about a first axis and including a pair of generally opposed airfoil surfaces, a leadng and a trailing edge associated with said surfaces, said airfoil surfaces terminating at a pair of end portions each of said portions connecting said one of said pair of surfaces to the other of said pair of surfaces, said end portions disposed at opposite ends of longitudinally extending blade, said apparatus comprising:
   an elongated stem secured at one of its ends to said airfoil blade;
   bearing means receiving said stem for supporting said airfoil blade for rotation siumltaneously about said first axis and about a second axis perpendicualr to said first axis;
   second means operatively connected to one of said end portions and movable about said two axes in response to variations in magnetic flux, said second means operative to pivotally rotate said blade simultaneously about said first and second axes;
   third means responsive to an electrical control signal for generating a variable magnetic flux field, said second means disposed within said magnetic flux field so as to be responsive to variations in said magnetic flux field;
   fourth means for providing said electrical control siganal to said third means.

2. The invention as set forth in claim 1 wherin said second axis resides in an airfoil mean surface plane.

3. The invention as set forth in claim 1 wherein said second means includes an excitable element operatively connected to said one of said end portions, said excitable element pivotable about said first axis in response to said variations in said magnetic flux.

4. The invention as set forth in claim 3 wherein said excitable element is further rotatable about said second axis in response to said variations in said magnetic flux.

5. The invention as set forth in claim 4 wherein said excitable element includes first and second spaced apart portions, said first axis being disposed between said spaced apart portions.

6. The invention as set forth in claim 5 wherein said third means includes first and second electromagnetic devices disposed adjacent said first and second spaced apart portions repectively, said fist electromagnetic driver generating a first variable magnetic flux field and said second electromagnetic driver generating a second variable magnetic flux field, said first and second spaced apart portions responsive to said first and second variable magnetic flux fields respectively and operative to pivotally rotate said blade about first axis and further operative to rotate said blade about said second axis.

7. The invention as set forth in claim 5 wherein said third means includes first, second, third and fourth electromagnetic drivers generating first, second, third and fourth variable magnetic flux fields respectively, said first and third electromagnetic drivers disposed adjacent said first spaced apart portion and said second and fourth electromagnetic drivers disposed adjacent said second spaced apart portion, said first and second portions responsive to said first and second variable magnetic flux fields respectively to pivotally rotate said blade about said first axis, said first and second portions responsive to said third and fourth variable magnetic flux fields respectively to rotate said blade about said second axis.

8. An apparatus for inducing vibrations in an airfoil blade extending longitudinally about a first axis and including a pair of generally opposed airfoil surfaces, a leading and a trailing edge associated with said surfaces, said airfoil surfaces terminating at a pair of end portions each of said portions connecting one of said pair of surfaces to the other of said pair of surfaces, said end portions disposed at opposite ends of said longitudinally extending blade, said apparatus comprising:
an elongated stem rigidly secured to said airfoil blade;
bearing means receiving said stem for supporting said airfoil blade for rotation about said first axis and a second axis;
second means operatively connected to said airfoil blade and disposed in a fixed spacial relationship with respect to said airfoil blade said second means adapted to be movable about said two axes in response to variations in magnetic flux,
third means responisve to an electrical control signal for generating a variable magnetic flux field, said second means disposed within said magnetic flux field so as to be responsive to variations in said magnetic flux field;
fourth means for providing said electrical control signal to said third means, said fourth means adapted to provide said control signal with first predetermined signal characteristics, said third means responsive to said control signal having said first signal characteristics to generate said variable magnetic flux field with first predetermined flux characteristics, said second means movable solely about said first axis in response to said flux field having said first flux field characteristics, said fourth means further adapted to provide said control signal with second predetermined signal characteristics, said third means responsive to said control signal having said second signal characteristics to generate said variable magnetic flux field with second predetermined flux characteristics, said second means movable solely about said second axis in response to said flux field having said second flux field characteristics, said second means disposed in said fixed spacial relationship during movement about said first and second axes.

9. The invention as set forth in claim 8 wherein said fourth means is adapted to provide said control signal with third predetermined signal characteristics, said third means responsive to said control signal having said third signal characteristics to generate said variable magnetic flux field with third predetermined flux characteristics, said second means movable simultaneously about said first and second axes in response to said flux field having said third flux field characteristics.

10. The invention as set forth in claim 9 wherein said control signal with second predetermined signal characteristics is comprised of a pair of electrical signals 180° out of phase with each other.

11. The invention as set forth in claim 10 wherein said control signal with second predetermined signal characteristics is comprised of a pair of electrical signals in-phase with each other.

12. The invention as set forth in claim 11 wherein said control signal with third predetermined signal characteristics is comprised of a pair of electrical signals having a phase difference with each other between 0° and 180°.

13. The invention as set forth in claim 8 wherein said second means is fixedly secured to said elongated stem.

14. The invention as set forth in claim 8 wherein said second means is fixedly secured to one of said end portions.

15. An apparatus for inducing vibrations in an airfoil blade extending longitudinally about a first axis and including a pair of generally opposed airfoil surfaces, a leading and a trailing edge associated with said surfaces, said airfoil surfaces terminating at a pair of end portions each of said portions connecting one of said pair of surfaces to the other of said pair of surfaces, said end portions disposed at opposite ends of said longitudinally extending blade, said apparatus comprising:
an elongated stem extending longitudinally generally along said first axis, and fixedly secured at one of its ends to one of said end portions of said airfoil blade;
a bearing assembly receiving said stem and adapted to support said stem portion and said airfoil blade for rotation about first and second axes;
a load beam fixedly secured to said elongated stem and extending transversely with respect thereto, said load beam including a pair of spaced apart excitable end portions adapted to be responsive to variations in magnetic flux;
a first electro-magnetic driver disposed proximate one of said pair of excitable end portions and adapted to generate a first variable magnetic flux field;
a second electro-magnetic driver disposed proximate the other of said pair of excitable end portions, and adapted to generate a second variable magnetic flux field, said excitable end portions adapted to selectively rotate said load beam said stem, and said airfoil blade solely about said first axis, solely about said second axis and simultaneously about said first and second axes in response to said first and second variable flux fields.

16. The invention as set forth in claim 1 further comprising position-sensing feedback means for providing an error signal to said control means for correcting oscillatory deviations of said airfoil.

* * * * *

UNITED STATES PATENT AND TRADEMARK OFFICE
CERTIFICATE OF CORRECTION

PATENT NO. : 4,019,375
DATED : April 26, 1977
INVENTOR(S) : Delmar H. Ellis et al It is certified that error appears in the above-identified patent and that said Letters Patent are hereby corrected as shown below:

Column 6, line 32, after "of" insert --said--.

Column 6, line 51, "siganal" should read --signal--.

Column 6, line 52, "wherin" should read --wherein--.

Column 7, line 7, after "about" insert --said--.

Column 8, line 14, "second" should read --first--.

*Signed and Sealed this*

*twenty-third* Day of *August 1977*

[SEAL]

Attest:

RUTH C. MASON
*Attesting Officer*

C. MARSHALL DANN
*Commissioner of Patents and Trademarks*